(12) United States Patent
Barre et al.

(10) Patent No.: US 10,350,793 B2
(45) Date of Patent: Jul. 16, 2019

(54) CASTING CUP ASSEMBLY FOR FORMING AN OPHTHALMIC DEVICE

(71) Applicant: Johnson & Johnson Vision Care, Inc., Jacksonville, FL (US)

(72) Inventors: Vincent H. Barre, Jacksonville, FL (US); Scott F. Ansell, Jacksonville, FL (US); Gregory L. Berckmiller, St. Johns, FL (US); Timothy Burkill, Limerick (GB); Mark McConnell, Limerick (GB)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 15/675,450

(22) Filed: Aug. 11, 2017

(65) Prior Publication Data
US 2017/0341275 A1 Nov. 30, 2017

Related U.S. Application Data

(62) Division of application No. 13/763,381, filed on Feb. 8, 2013, now Pat. No. 9,884,435.

(51) Int. Cl.
*B29C 33/42* (2006.01)
*B29D 11/00* (2006.01)
*G02C 7/04* (2006.01)

(52) U.S. Cl.
CPC .......... *B29C 33/42* (2013.01); *B29D 11/0048* (2013.01); *B29D 11/00221* (2013.01); *G02C 7/04* (2013.01)

(58) Field of Classification Search
CPC .............. B29C 33/42; B29D 11/00221; B29D 11/0048; G02C 7/04
See application file for complete search history.

(56) References Cited

U.S. PATENT DOCUMENTS

| 5,252,056 A * | 10/1993 | Homer ................. B29C 33/202 249/121 |
| 5,254,000 A * | 10/1993 | Friske .................. B29C 33/202 249/134 |
| 5,540,410 A * | 7/1996 | Lust .................... B29C 33/0011 249/117 |
| 6,444,145 B1 * | 9/2002 | Clutterbuck ..... B29D 11/00057 249/117 |

(Continued)

FOREIGN PATENT DOCUMENTS

| EP | 0786871 | 8/1997 |
| EP | 0788871 A2 * | 8/1997 ........... B29C 31/006 |
| JP | 6-106552 | 4/1994 |

(Continued)

OTHER PUBLICATIONS

JP Communication dated Jun. 6, 2017: Application No. 2014-021967 (Year: 2017).*

*Primary Examiner* — Joseph S Del Sole
*Assistant Examiner* — John Robitaille

(57) ABSTRACT

Disclosed in this specification is a casting cup assembly comprising frontcurve and basecurve molds which of which includes a ring that circumscribes the respective concave and convex mold surface. When the casting cup is assembled, the rings align and minimize de-centering and tilting of the concave and convex mold surfaces which, in turn, reduces edge defects.

10 Claims, 6 Drawing Sheets

(56) References Cited

U.S. PATENT DOCUMENTS

| | | | | |
|---|---|---|---|---|
| 6,997,428 B1* | 2/2006 | Andino | ............ | B29D 11/00432 |
| | | | | 249/134 |
| 2008/0073804 A1* | 3/2008 | Matsuzawa | ...... | B29D 11/00192 |
| | | | | 264/2.6 |

FOREIGN PATENT DOCUMENTS

| | | | |
|---|---|---|---|
| JP | 6106552 B2 * | 4/2017 | |
| WO | 2000059713 A1 | 10/2000 | |
| WO | WO2000059713 A1 * | 10/2000 | |

* cited by examiner

CASTING CUP ASSEMBLY FOR FORMING AN OPHTHALMIC DEVICE

CROSS-REFERENCE TO RELATED APPLICATIONS

This application is a divisional of U.S. application Ser. No. 13/763,381 filed on Feb. 8, 2013, the entire contents of which are hereby incorporated by reference.

FIELD OF THE INVENTION

This invention relates, in one embodiment, to a casting cup assembly for forming ophthalmic devices such as contact lenses. It also relates to a mold design for making the casting cup assemblies and to lenses made from the casting cup assemblies.

BACKGROUND

Many ophthalmic devices, including contact lenses, surgical lenses, intraocular lenses, and the like, are often made by performing a polymerization reaction within a casting cup assembly. The casting cup assembly includes a basecurve mold, which forms the portion of the device that rests against the eye, and a frontcurve mold, which forms the portion of the device facing away from the eye. A reaction mixture, which includes one or more polymerizable monomers and other components, is disposed in the frontcurve mold. Thereafter, the basecurve mold is pressed against the frontcurve mold and the reaction mixture is forced to adopt the shape of the volume defined between the two molds. After properly being positioned, the reaction mixture is subjected to polymerization conditions (e.g. photopolymerization or other suitable technique). The resulting polymer is removed from the casting cup assembly and subjected to post-polymerization processing (e.g. rinsing, hydration, etc) to provide a finished ophthalmic device. Separation of the lens from the mold assembly requires accurate and precise prying of the lens mold halves apart to release the cast contact lens. Precise automated prying mechanisms are employed and the repeated operation of this step is a critical factor in maintaining high yields of lenses that meet the requirements of the lens design.

During this post-polymerization processing, careful inspection of the lenses often reveals a substantial number of the lenses contain defects. Defects include a variety of fabrication errors such as holes in the lenses, tears in the edges, the presence rings of excess polymer around the ophthalmic device, and other similar defects. Therefore, an improved casing cup assembly that allows repeatable and precise opening of the lens mold assemblies and prevents excess flash material from interfering with the prying mechanisms is desired to reduce the occurrence of these defects.

In U.S. Pat. No. 5,540,410 incorporated herein by reference are disclosed molds and their use in contact lens manufacture. With all cast molding methods the manufacture of lenses that meet the intended design parameters is the key goal and is difficult to obtain with complete accuracy given the very precise design parameters that are called for, slight variation in the thickness and contour of the lens, especially relating to its optical zone, and clean edges that show no signs of tears or deformation. In addition, other various approaches to lens mold design have been developed over time. For instance, U.S. Pat. No. 6,997,428 shows the use of tabs to align optical surface and that may also be used to pull the mold halves apart. There is no indication that the tabs are used to deliver melt or to provide plane offset between the mold portions.

U.S. Pat. No. 5,252,056 illustrates a process that uses rotationally symmetric parts and which does not use a blade as a means for having a hot runner run through the blade to improve injection flow by broadening the injection front. U.S. Pat. No. 5,254,000 teaches small tabs for interlocking mold halves and U.S. Pat. No. 6,444,145 uses one blade rather than the four of the present invention.

None of the references use multiple blades to deliver monomer on a broadened injection front and to improve the separation of mold halves after curing.

SUMMARY OF THE INVENTION

Disclosed in this specification is a casting cup assembly comprising precision manufactured frontcurve and basecurve molds which include a set of four blades on the periphery of both the frontcurve and basecurve molds. When the casting cup is assembled the blades allow for a larger footprint to be handled by the automated systems equipment. The four blades are also out of plane with the mold half and allow for a more robust prying equipment since the offset allows for great space between the two mold halves. An advantage that may be realized in the practice of some disclosed embodiments of the casting cup assembly is the reduction of edge defects by minimizing the de-centering and tilting of the concave and convex mold surface surfaces of a casting cup assembly increased area available to operate prying apparatus on the cup assembly and also additional area to keep overflow monomer from exiting the cup assembly and contaminating the prying apparatus.

In one exemplary embodiment, a casting cup assembly is disclosed. The casting cup assembly comprises a frontcurve mold with a concave mold surface, an annular flat ring, a ridge that acts as a dam, a transition zone and a plurality of blades. The assembly further comprises a basecurve mold with a convex mold surface, and annular flat ring, a transition zone and a plurality of blades. When the frontcuve mold is mated with the basecurve mold, a mold cavity defining the desired lens is formed, the annular rings cooperate in parallel to allow overflow if the dosed monomer to form flashing, and the two sets of multiple blades also cooperate in parallel to one another with a thickness between them greater than the thickness between the two annular flat rings, thus allowing more space for robust prying mechanism that would be the case if the annular flats were used.

In another exemplary embodiment, a casting cup assembly is disclosed. The casting cup assembly comprises frontcurve mold with a concave mold surface circumscribed by a ring. The assembly further comprises a basecurve mold with a convex mold surface and four blades disposed 90 degrees from the adjacent blades.

In another exemplary embodiment, one of the blades is thicker than the other three blades. This thicker blade design is achieved by providing for a thicker blade cavity in the molds used to produce the casting cup. This thicker blade cavity is then in communication with the runner system of the mold to introduce plastic into the mold as part of the molding process. The thicker blade allows a broader melt front of plastic which reduces turbulent flow of the plastic into the mold. The net effect is that the plastic conforms to the mold better and produces a casting cup mold assembly that is closer to the designed specification.

BRIEF DESCRIPTION OF THE DRAWINGS

The present invention is disclosed with reference to the accompanying drawings, wherein.

Corresponding reference characters indicate corresponding parts throughout the several views. The examples set out herein illustrate several embodiments of the invention but should not be construed as limiting the scope of the invention in any manner.

DETAILED DESCRIPTION

Figure 1:
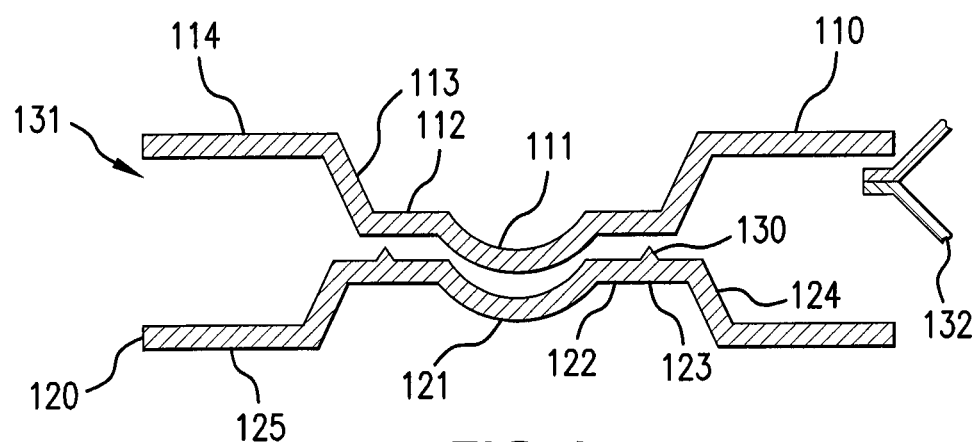
FIG. 1 shows a schematic profile view of a frontcurve and backcurve section of a mold apparatus of the present invention.

Some of the factors that impact the occurrence of edge defects in ophthalmic devices include failures in prying open the mold halves. In practice, some defects occur due to contamination of the prying mechanisms or simple failure due to wear. Providing a mold assembly that allows for more robust and precise prying mechanism, and greater area in the mold assembly to maintain overflow monomer and subsequent flashing leads to fewer defects in contact lenses. FIG. 1 shows a schematic view of the present invention including a frontcurve mold half that has a central mold section 121, an annular flat ring 122, a monomer dam 123, a transition zone 124, and a plane with a set of plurality of blades 125; a back curve mold half with a backcurve central mold section 111, an annular flat ring 112, a transition zone 113 and a plane 114 with a sets plurality of blades. The two sets of plurality of blades defines a prying space 131. The two mold halves form a cavity 134 that defines the contact lens to be molded. The dam 123 provides a barrier to contain excess monomer dosage from spreading to the prying space. The molds in cooperation with one another define the mold cavity and a first separation 130 between the hold halves and a second separation 131 between the mold halves where the second separation between the protruding blades is where prying mechanisms 133 are automatically inserted to pry the mold halves apart as part of the manufacturing process of contact lenses.

Figure 2:
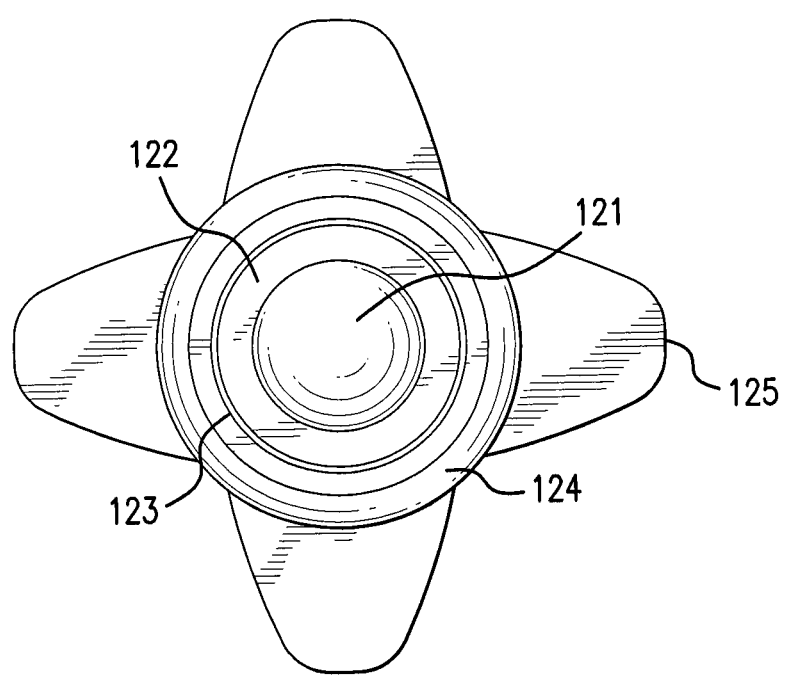
FIG. 2 shows a schematic top view of frontcurve casting cup showing the features of the casting cup including the four blades.

FIG. 2 shows a schematic drawing of a frontcurve mold half. The set of plurality of blades 125 are disposed in a plane that is out of plane with the annular flat ring. As can be seen from the figure the four blades 125 are disposed in a plane 90 degrees from each other in a symmetric fashion that allows the two mold halves to sit stably when they are dosed with monomer and placed together.

Figure 3:
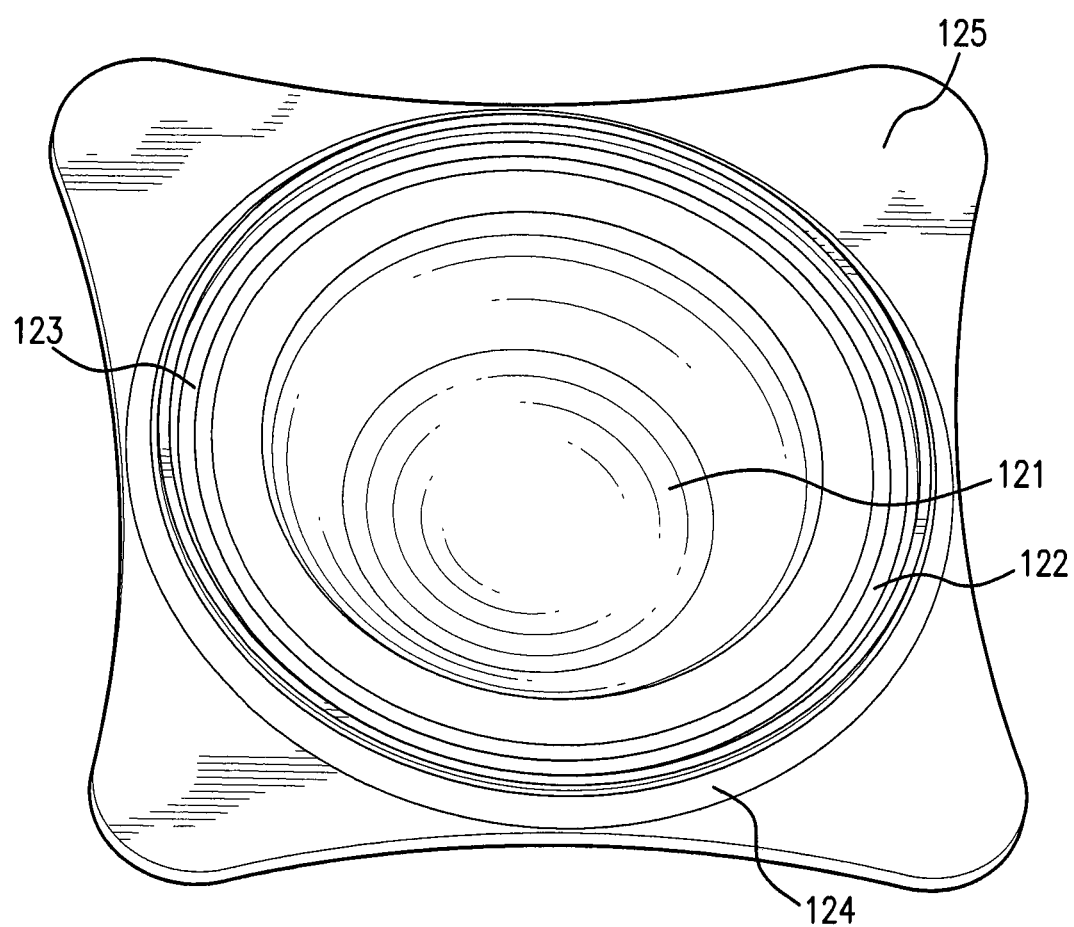
FIG. 3 is a perspective view of a backcurve casting cup showing the features of the casting cup including the four blades.

FIG. 3 is a scaled drawing of the frontcurve 120 mold half which also shows an embodiment of the present invention with the plurality of blades in a plane offset from one another by about 90 degrees. In operation, the backcurve mold sits on top of the frontcurve mold and the monomer dosage is placed in the concave portion of the frontsurface lens mold.

Figure 4:
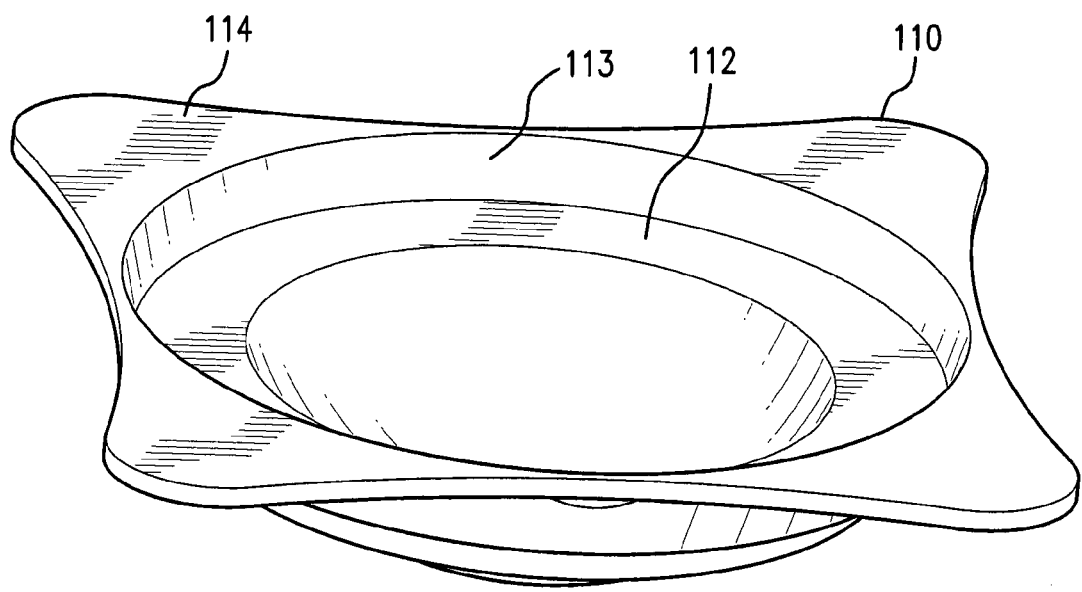
FIG. 4 shows a schematic of a small pitch difference setup of producing contact lenses according to the present invention.

FIG. 4 provides a scaled drawing of the backcurve mold with the backcurve mold 110 features displayed in a three dimensional representation, namely the central convex section 111, the annular flat ring 112, the transition zone 113, and the plurality of blades 114.

Figure 5:
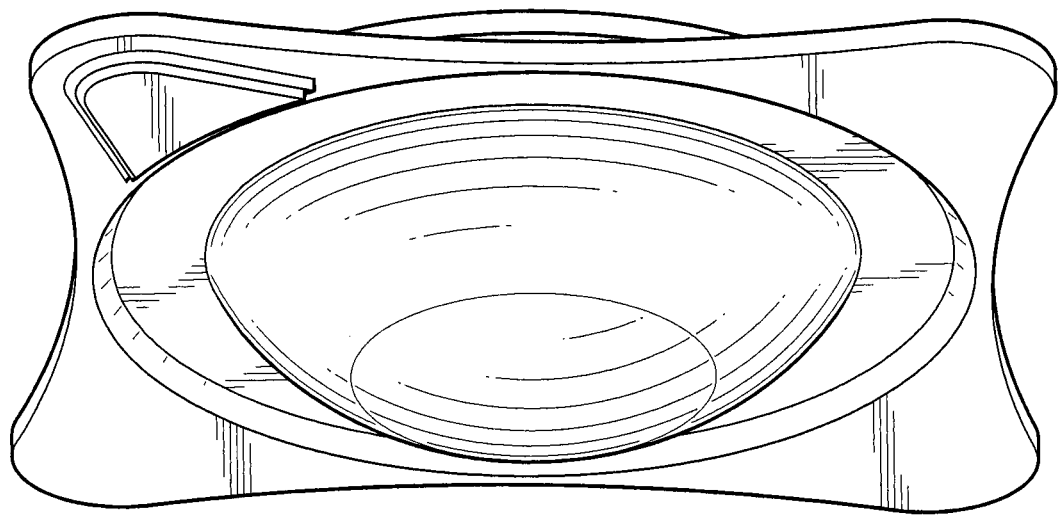
FIG. 5 shows an embodiment of the invention one of the blades has a feature to improve melt flow.

FIG. 5 shows a scaled drawing of a frontcurve mold with a melt means feature, a small trough, disposed on one of the blades.

Figure 7:
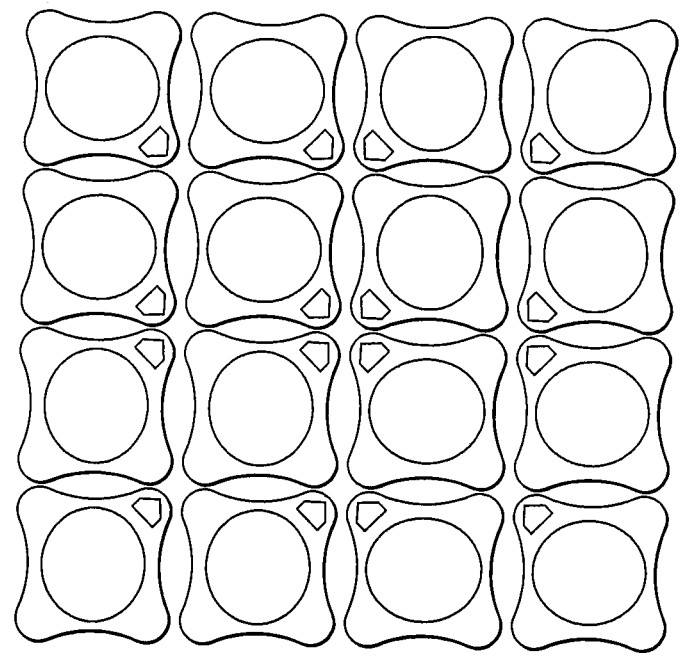
FIG. 7 shows a schematic of an array of small pitch difference cups in an array where the mold half assemblies are arranged for the process of dosing, and curing.

FIG. 7 shows another schematic of mold cup assembly arrays. In this system a tray of mold cup assemblies is used in the manufacturing process and the tray is set up into quadrants where all of the asymmetric cups in each quadrant are presented in the same orientation.

The four blades 114, 125 are out of plane from the flat annular portion 112, 122 of the frontsurface mold and backsurface mold may be thicker in the range of 0.050 mm to 0.4 mm with a preferred value of 0.2 mm than the other blades to allows the melt plastic to enter mold with a broader path to spread across the cavity. Remember that this is the step where each of the mold halves is being molded. Where this step is done with better melt flow the mold half produces is closer to the design which subsequently provides more consistent lens formation.

The front surface contact lens mold also has an annular ridge 123 disposed on the flat annular surface that acts as a dam to contain excess monomer flash from dosing the mold in the contact lens manufacturing process.

The blades also serve to provide the planar offset that allows greater spacing than the mold cavity itself which provides the added advantage of allowing more robustly designed prying apparatus.

The back surface contact lens mold half shown in FIG. 4 has a concave central portion 111 and an annular flat area 112. The convex central portion of the back surface mold cooperates with the concave central portion of the front surface mold to define the mold cavity 134. The back surface contact lens mold half has four blades separated from one another by 90 degrees that cooperate with the blades from the front surface mold to provide greater control of the orientation along a plane between the mold halves and allows an easier interface for prying tools to be inserted to separate the mold halves.

The front surface mold half also has an annular plane with a beveled edge adjacent to the central zone that cooperates with an annular flat indentation with a beveled edge of the back surface mold half that allows precise orientation of the two surfaces to form the mold cavity producing the contact lens. The operation of the two sets of blades on each mold half produces the slight planar offset.

FIG. 7 shows an alternate setup used when the pitch difference is lower, in the range of less than about 20 mm, then the array can have more lenses mold assemblies and the orientation of each of the mold assemblies can be maintained due to the symmetry of the mold design.

The mold cups of the present invention have the following features: 1—Four Scalloped blades are protruding at about a 90 degree angle from each other; 2—One of the blades is used as a surface appropriate for interfacing with the melt delivery; The system of the mold. The melt delivery system can be any of the various methods known using for instance, either a cold or a hot runner: 3—Under the melt delivery blade, also named tab, an increased thickness between 0.050 mm to 0.4 mm with a preferred value of 0.2 mm. The goal of this feature is to broaden the melt front before entering the bowl. Any shape that serves this purpose (example: beveled surface, trench before bowl) can be used. The overall plastic shape disclosed still provides very useful improvement in molding processes without the this feature: 4—On each of the casting cup forming the front curve of the lens (FC) and the base curve of the lens (BC), a plane shift occurs between the flat region just outside the bowl and another flat region that extends to the blades. The ratio of these regions can vary. The plane shift can occur on either the FC or the BC, or, in a preferred embodiment on both: 5—The thickness of the blades is equivalent or thinner than the thickness of the inner plane and bowl area. In a preferred embodiment, the difference in thickness is 0.1-mm. 6—The pitch of the parts is superior to the part width. In a preferred embodiment, the pitch between parts is 0.050 mm to 0.4 mm with a preferred value of 0.2 mm. Thanks to these features, the following advantages can be reached: a—Parallelism is necessary between the front curve and base curve to achieve good separation between the uncured lens and the excess monomer ring. In addition some designs with non spherical base curve require parallelism to reduce any optical aberration. Compared to nonsymmetrical plastic the base curve presented in this invention will not tend to shift on top of the front curve after the monomer is deposited and before cure. Any asymmetry will induce the risk for the base curve to shift due to the unbalanced weight.

The plane shift between the flat section just outside the bowl and the flat section/blade will allow limiting monomer contamination/spilling during dose and assembly on the external plane. This will leave a clean area for prying apart the two casting cups post cure. A clean prying area is critical to yield and uptime because accumulation of uncured monomer on the pry mechanism leads to clogs and jams.

The four-bladed area and clean outside plane offers an increased ease of handling compared to parts that are asymmetric or smaller in projected surface. Lifting and displacing the casting cups via the mean of suction cups or other mechanism is facilitated by both the symmetry and the large surface. The plane shift between the inner flat section and the outer flat section extending to the blades allows to have a section with an increased distance between the FC and BC after they are assembled. This enables the use of larger prying mechanism. Larger prying mechanisms are advantageous because they are easier to manufacture and offer a larger resistance.

Figure 6:
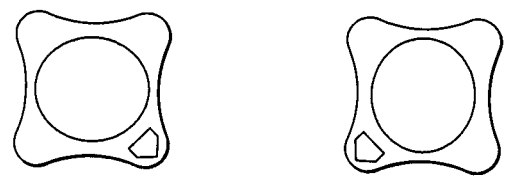
FIG. 6 shows a schematic of a large pitch difference setup using the present invention to produce contact lens/mold halves in the initial mold.
Figure 6:
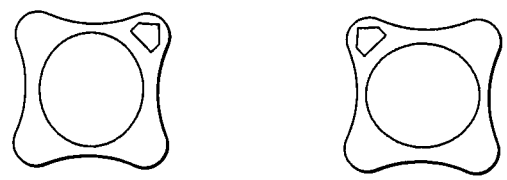

The presence of specifically four blades allows several assembly options. For instance, one of the assembly options is such that the blades on the FC and the BC are aligned. In such case the prying mechanism can offer a similar deformation between the front curve and the base curve. In another option, the BC can be oriented with the blades at 45 degrees from the FC. In such case, it is possible to use a prying mechanism such that the FC is clamped flat and an amount of flexion is introduced on the BC. Such options and attributes can depending on the lens monomer used lower the defect rate that might appear during the prying operation. The casting cup manufacturing benefits for molds with a large pitch between parts. Such molds allow for large cooling line options and shape as well as a variety of hot or cold runner options. Conversely, further lens manufacturing steps such as dosing, FC/BC assembly and prying benefit from a small footprint for cost and space efficiencies. One possibility to accommodate for this variation is to change the pitch of the parts with a robot. However this invention allows having a mold that has twice the pitch of the downstream line (see FIG. 6). The robot then transfers parts in the downstream pallet and deposits every other cavity. The 90 degree symmetry of the part invented allows for the retention of homogeneity in part presentation to downstream robots. The thinner blades will fill after the bowl area, providing equivalent filling properties compared to one/bladed (one tab) parts that are well known to provide appropriate dimensional stability.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method for manufacturing contact lenses, comprising:
   providing an array of four casting cup assemblies disposed around a center wherein each casting cup assembly comprises a frontcurve mold with four protruding blades and a backcurve mold with four protruding blades, wherein one of said protruding blades is thicker than the others and the thick blade of each of said casting cup assemblies is oriented towards the center of said array;
   depositing a monomer mixture into the array of four casting assemblies; and
   curing the monomer mixture.

2. The method of claim 1, further comprising opening the array of four casting cup assemblies to expose the cured monomer mixture by prying the casting cup assemblies apart at the protruding blades.

3. The method of claim 2, wherein the frontcurve mold further comprises:
   a concave mold surface disposed on a top-side of the frontcurve mold;
   a first flat annular ring with an inner periphery and an outer periphery, wherein the inner periphery of the first flat annular ring is surrounding and contiguous with the perimeter of the concave mold surface;
   a first ring disposed on said first flat annular ring forming a dam;
   a first transition zone disposed on the outer periphery of said first flat annular ring; and
   a first plane comprising a first plurality of flat blades, wherein the first plane is disposed on the first transition zone; and
   wherein the backcurve mold further comprises:
   a convex mold surface disposed on a bottom-side of the backcurve mold, the convex mold surface having a perimeter that is surrounded by a bottom surface;
   a second flat annular ring with an inner periphery and an outer periphery;
   a second transition zone disposed on the outer periphery of said second flat annular ring; and
   a second plane comprising a second plurality of flat blades, wherein the second plane is disposed on the second transition zone.

4. The method of claim 3, wherein the concave mold surface and convex mold surface have different curvatures such that a cavity is formed between the concave mold surface and the convex mold surface when the backcurve mold is disposed on the frontcurve mold.

5. The method of claim 4, wherein the second flat annular ring is spaced away from the surface of the first flat annular ring by a first gap when the backcurve mold is disposed on the frontcurve mold.

6. The method of claim 5, wherein the first plurality of flat blades is spaced away from the second plurality of flat blades by a second gap when the backcurve mold is disposed on the frontcurve mold.

7. The method of claim 5, wherein the first gap is less than about 0.050 millimeters.

8. The method of claim 6, wherein the second gap is in the range of about 0.050 to 0.4 millimeters.

9. The method of claim 1, wherein one of said-first plurality of flat blades has an interface with a melt delivery means.

10. The method of claim 9, wherein the interface has a runner feature chosen from troughs, beveled surface, and trench before bowl.

\* \* \* \* \*